(12) United States Patent
Okada (10) Patent No.: US 10,821,346 B2
(45) Date of Patent: Nov. 3, 2020

(54) APPARATUS USED FOR WATER SPORT, INFORMATION PROVIDING METHOD, AND PROGRAM STORAGE MEDIUM

(71) Applicant: CASIO COMPUTER CO., LTD., Tokyo (JP)

(72) Inventor: Takeshi Okada, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 161 days.

(21) Appl. No.: 16/140,629

(22) Filed: Sep. 25, 2018

(65) Prior Publication Data

US 2019/0091539 A1 Mar. 28, 2019

(30) Foreign Application Priority Data

Sep. 27, 2017 (JP) .................... 2017-186292

(51) Int. Cl.
| | | |
|---|---|---|
| *A63B 69/00* | (2006.01) | |
| *G01C 13/00* | (2006.01) | |
| *A63B 71/06* | (2006.01) | |
| *G06F 1/16* | (2006.01) | |
| *G04G 9/00* | (2006.01) | |
| *A63B 24/00* | (2006.01) | |
| *G01D 21/02* | (2006.01) | |

(Continued)

(52) U.S. Cl.
CPC ...... *A63B 69/0093* (2013.01); *A63B 71/0686* (2013.01); *G01C 13/002* (2013.01); *G06F 1/163* (2013.01); *A63B 24/0087* (2013.01); *A63B 71/0619* (2013.01); *A63B 2071/0663* (2013.01); *A63B 2220/12* (2013.01); *A63B 2220/40* (2013.01); *A63B 2220/62* (2013.01); *A63B 2220/806* (2013.01); *A63B 2220/807* (2013.01); *A63B 2225/50* (2013.01); *G01C 1/00* (2013.01); *G01D 21/02* (2013.01); *G04G 9/0064* (2013.01); *G04G 21/02* (2013.01); *G04G 21/04* (2013.01); *G04R 20/02* (2013.01)

(58) Field of Classification Search
CPC ............ A63B 69/0093; A63B 2220/12; A63B 2220/62; A63B 2220/807; A63B 2220/806; A63B 2220/40; A63B 24/0087; A63B 71/0619; A63B 2071/0663; A63B 2225/50; G01C 13/002; G01C 1/00; G06F 1/163; G04F 10/00; G04R 20/02; G04G 9/0064; G04G 21/04; G04G 21/02; G01D 21/02

See application file for complete search history.

(56) References Cited

U.S. PATENT DOCUMENTS

| | | | | |
|---|---|---|---|---|
| 7,230,883 B2 * | 6/2007 | Marhic | ............... | G04G 9/0064 368/10 |
| 7,800,982 B2 * | 9/2010 | Marhic | ............... | G04G 9/0076 368/10 |

(Continued)

FOREIGN PATENT DOCUMENTS

JP 2016-180620 A 10/2016

*Primary Examiner* — Jonathan M Dunlap
(74) *Attorney, Agent, or Firm* — Scully Scott Murphy & Presser (57) ABSTRACT

A user performing a water sport is appropriately supported. A wrist terminal includes an LCD and an output control unit. The output control unit measures a time from when a swell of a wave occurs or passes until the swell breaks. In addition, the output control unit causes the LCD to display time information of the measured time.

20 Claims, 7 Drawing Sheets

(51) Int. Cl.
    *A63B 71/00*               (2006.01)
    *G04G 21/02*              (2010.01)
    *G01C 1/00*               (2006.01)
    *G04G 21/04*              (2013.01)
    *G04R 20/02*              (2013.01)

(56) References Cited

U.S. PATENT DOCUMENTS

| | | | | |
|---|---|---|---|---|
| 8,290,636 B2* | 10/2012 | Manning | | B63B 32/10 701/1 |
| 9,014,983 B1* | 4/2015 | Uy | | G01W 1/02 244/30 |
| 9,020,538 B1* | 4/2015 | White | | A61B 5/1123 455/456.3 |
| 9,223,057 B1* | 12/2015 | Uy | | G01W 1/02 |
| 9,223,058 B1* | 12/2015 | Uy | | G01W 1/02 |
| 9,291,453 B2* | 3/2016 | White | | H04W 4/029 |
| 9,697,743 B2* | 7/2017 | Regan | | A61B 5/6895 |
| 10,384,749 B2* | 8/2019 | Thompson | | B63B 32/70 |
| 2005/0190652 A1* | 9/2005 | Marhic | | G04G 9/0076 368/15 |
| 2007/0237033 A1* | 10/2007 | Marhic | | G04G 9/0064 368/19 |
| 2008/0262666 A1* | 10/2008 | Manning | | G01C 13/002 701/21 |
| 2016/0047651 A1* | 2/2016 | White | | A61B 5/681 702/3 |
| 2016/0136482 A1* | 5/2016 | Askew, Jr. | | G01S 19/19 700/91 |
| 2016/0202057 A1* | 7/2016 | White | | A63B 24/0062 73/170.31 |
| 2016/0347426 A1* | 12/2016 | Thompson | | B63B 32/70 |
| 2017/0032693 A1* | 2/2017 | Regan | | A63B 69/0093 |
| 2018/0321033 A1* | 11/2018 | Tauriac | | F03B 13/262 |
| 2019/0204080 A1* | 7/2019 | Adler | | G01C 13/00 |

\* cited by examiner

APPARATUS USED FOR WATER SPORT, INFORMATION PROVIDING METHOD, AND PROGRAM STORAGE MEDIUM

CROSS-REFERENCE TO RELATED APPLICATIONS

This application is based upon and claims the benefit of priority under 35 USC 119 of Japanese Patent Application No. 2017-186292 filed on Sep. 27, 2017 the entire disclosure of which, including the description, claims, drawings, and abstract, is incorporated herein by reference in its entirety.

BACKGROUND OF THE INVENTION

1. Field of the Invention

The present invention relates to an apparatus used for a water sport, an information providing method, and a program storage medium.

2. Description of the Related Art

Conventionally, in a sport such as surfing, snowboarding or cycling, there has been a known technology of attaching a device incorporating a sensor to a body and measuring various data items in the sport. For example, Patent Document 1 describes that a height of a wave corresponding to a swell is measured in various places, and the measured information is reported to a user who surfs.

Patent Document 1: Japanese Unexamined Patent Application, Publication No. 2016-180620

BRIEF SUMMARY OF THE INVENTION

One aspect of the embodiment is an apparatus used for a water sport providing information for assisting in acquiring information on a wave and assisting in determining a timing at which a user starts movement when the user performs the water sport, the apparatus comprising: a CPU and a memory; a reporting device; and a measurement device for measuring a time from the timing when a swell of the wave occurs or passes through the current position of the user until timing of the swell breaks, the CPU causing the reporting device to report time information or timing information related to a timing at which the swell of the wave occurs based on the measured time according to a program stored in the memory.

DETAILED DESCRIPTION OF THE INVENTION

Embodiments of the present invention will be explained with reference to the drawings.

Hereinafter, an embodiment of the invention will be described with reference to drawings.

[Hardware Configuration]

Figure 1A:
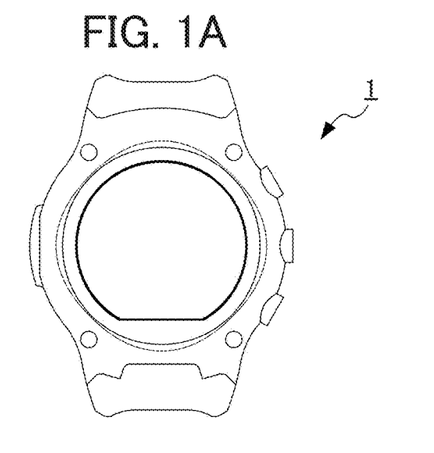
FIG. 1A is a diagram illustrating an appearance configuration of a wrist terminal as an embodiment of an apparatus used for a water sport of the invention.
Figure 1B:
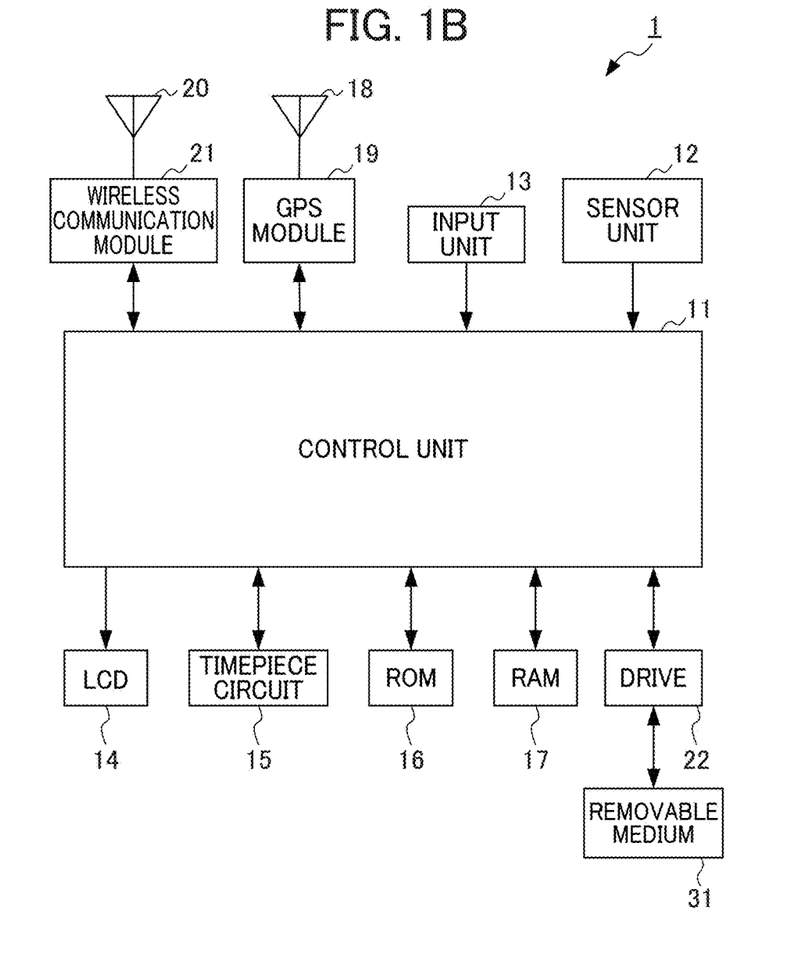
FIG. 1B is a block diagram illustrating a hardware configuration of the wrist terminal as the embodiment of the apparatus used for the water sport of the invention.

FIG. 1A is a diagram illustrating an appearance configuration of a wrist terminal 1 as an embodiment of an apparatus used for a water sport of the invention, and FIG. 1B is a block diagram illustrating a hardware configuration of the wrist terminal 1 as the embodiment of the apparatus used for the water sport of the invention. The wrist terminal 1 is configured in a wristwatch type and has a function similar to that of a smartphone. As illustrated in FIG. 1A and FIG. 1B, the wrist terminal 1 includes a control unit 11, a sensor unit 12, an input unit 13, a liquid crystal display (LCD) 14, a clock circuit 15, a read only memory (ROM) 16, a random access memory (RAM) 17, a global positioning system (GPS) antenna 18, a GPS module 19, a wireless communication antenna 20, a wireless communication module 21, and a drive 22. Incidentally, the wrist terminal 1 can be provided with other hardware such as an image capture unit as appropriate.

The control unit 11 includes an arithmetic processing unit such as a central processing unit (CPU) and controls an operation of the entire wrist terminal 1. For example, the control unit 11 executes various processes in accordance with a program recorded in the ROM 16 such as a program for a support information provision process (described below). The sensor unit 12 includes various sensors such as an acceleration rate sensor, a gyro sensor, an atmospheric pressure sensor, a geomagnetic sensor, an image sensor, a microphone, or an altitude sensor. The acceleration rate sensor detects acceleration rates in three axial directions in the wrist terminal 1 and outputs information indicating the detected acceleration rates to the control unit 11.

The gyro sensor detects angular rates in three axial directions in the wrist terminal 1 and outputs information indicating the detected angular rates to the control unit 11. The atmospheric pressure sensor detects an atmospheric pressure under an environment in which the wrist terminal 1 is present, and outputs information indicating the detected atmospheric pressure to the control unit 11. In the present embodiment, the atmospheric pressure sensor detects an atmospheric pressure in air and detects a water pressure in water.

The input unit 13 includes various buttons, a capacitance type or resistance film type position input sensor stacked in a display area of the LCD 14, etc., and inputs various information items according to an instruction manipulation of a user. The LCD 14 outputs an image in accordance with an instruction from the control unit 11. For example, the LCD 14 displays screens of various images and user interfaces. In the present embodiment, the position input sensor of the input unit 13 is superimposed on the LCD 14 to constitute a touch panel. The clock circuit 15 generates a time signal from a signal generated by a system clock or an oscillator, and outputs a current time.

The ROM 16 stores information such as a control program executed by the control unit 11. The RAM 17 provides a work area when the control unit 11 executes various processes. The GPS antenna 18 receives a radio wave transmitted from a satellite in a GPS, converts the received radio wave into an electric signal, and outputs the converted electric signal (hereinafter referred to as a "GPS signal") to the GPS module 19. The GPS module 19 detects a position (latitude, longitude, altitude) of the wrist terminal 1 and a current time indicated by the GPS based on the GPS signal input from the GPS antenna 18. In addition, the GPS module 19 outputs information indicating the detected position and current time to the control unit 11.

The wireless communication antenna 20 is an antenna capable of receiving a radio wave of a frequency corresponding to wireless communication used by the wireless communication module 21, and includes, for example, a loop antenna or a rod antenna. The wireless communication antenna 20 transmits an electric signal of wireless communication input from the wireless communication module 21 as an electromagnetic wave, or converts the received electromagnetic wave into an electric signal to output the converted electric signal to the wireless communication module 21. The wireless communication module 21 transmits a signal to another device via the wireless communication antenna 20 in accordance with an instruction from the control unit 11. In addition, the wireless communication module 21 receives a signal transmitted from another device, and outputs information indicated by the received signal to the control unit 11. A removable medium 31 including a magnetic disk, an optical disc, a magneto-optical disc, a semiconductor memory, etc. is appropriately mounted on the drive 22. The removable medium 31 can store various data items such as position and altitude data.

Figure 2:
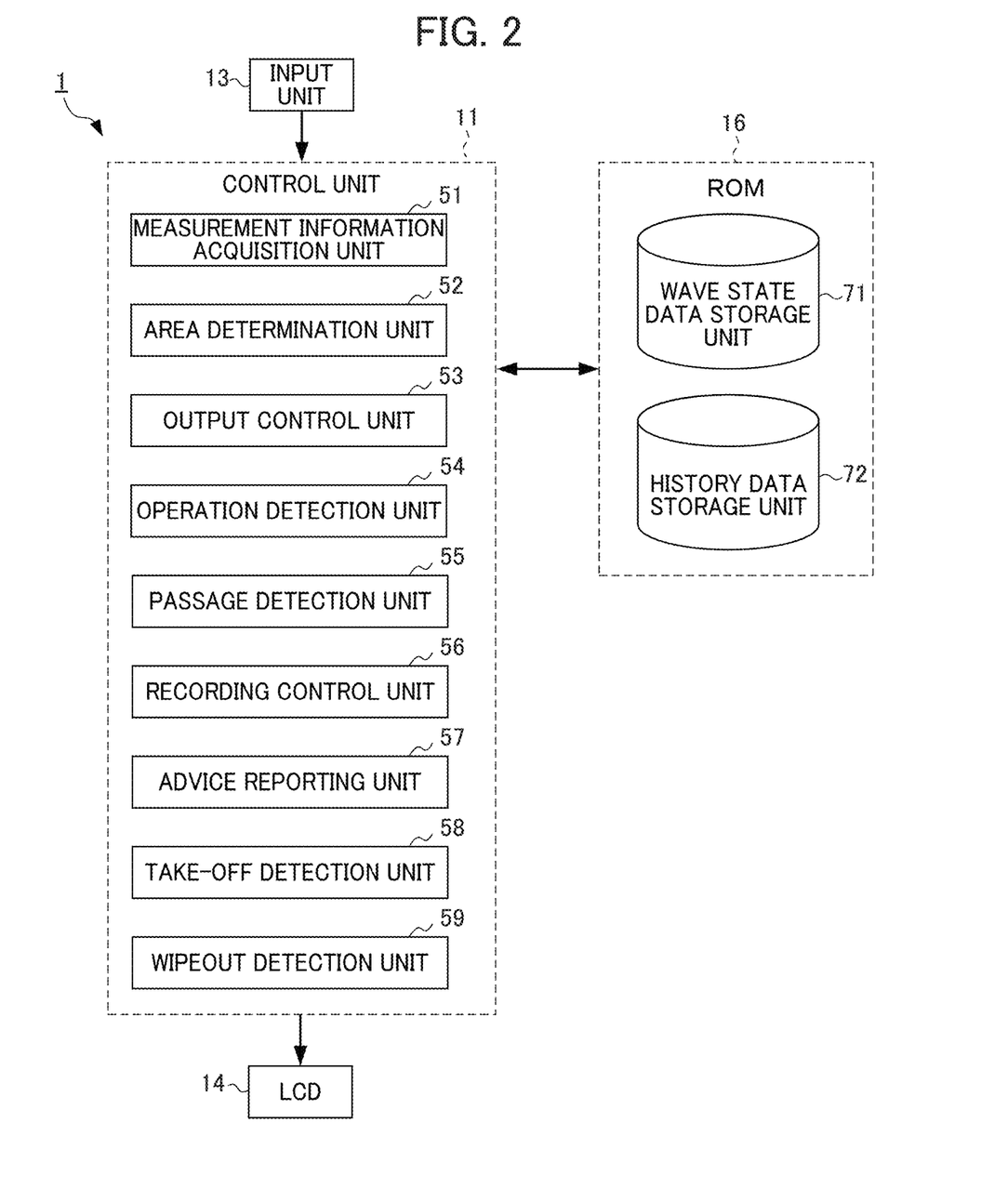
FIG. 2 is a functional block diagram illustrating a functional configuration for executing a support information provision process among functional configurations of the wrist terminal of FIG. 1A and FIG. 1B.

FIG. 2 is a functional block diagram illustrating a functional configuration for executing the support information provision process among functional configurations of the wrist terminal 1 of FIG. 1A and FIG. 1B. The support information provision process refers to a series of processes of providing information for assisting in acquiring wave information and assisting in determining a timing at which a user wearing the wrist terminal 1 needs to start movement when the user performs a water sport. Incidentally, in the present embodiment, a description is given using the case of assisting the user wearing the wrist terminal 1 when the user surfs as an example. In addition, in description below, an action in which a surfer rises on a surfboard by riding on a wave will be referred to as "take-off". Thereafter, an action of getting off the surfboard by a break of a wave, etc. will be referred to as "wipeout", and a state of riding a wave from take-off to wipeout will be referred to as "riding". Furthermore, a massive and crestless wave or succession of waves will be referred to as "swell".

In a case in which the support information provision process is executed, as illustrated in FIG. 2, a measurement information acquisition unit 51, an area determination unit 52, an output control unit 53, an operation detection unit 54, a passage detection unit 55, a recording control unit 56, an advice reporting unit 57, a take-off detection unit 58, and a wipeout detection unit 59 function in the control unit 11. In addition, a wave state data storage unit 71 and a history data storage unit 72 are set in one area of the ROM 16. The wave state data storage unit 71 stores data related to a wave state measured based on an operation of the user or measurement information. For example, the data related to the wave state includes a time and a distance from a timing at which the wave climbs over a position of the user to a timing at which the wave breaks. In the history data storage unit 72, data of a riding history is stored for each ride of surfing. In the present embodiment, a riding trajectory, a top speed, a distance of one riding, a time of one riding, a take-off time, etc. are stored as the data of the riding history. Incidentally, it is presumed that one riding is counted as "one".

The measurement information acquisition unit 51 acquires a positioning result of the GPS module 19 and detection results of various sensors provided in the sensor unit 12 (hereinafter collectively referred to as "measurement information" as appropriate) at a predetermined time interval (for example, an interval of 0.1 seconds). For example, the measurement information acquisition unit 51 successively acquires a positioning result (current position) of the GPS module 19 and a detection result of the atmospheric pressure sensor of the sensor unit 12 as measurement information. Incidentally, in the present embodiment, the measurement information includes data obtained by appropriately applying predetermined calculation (differentiation, etc.) to output data of the sensor. For example, data on a speed obtained by differentiating the positioning result of the GPS module 19 is included in the measurement information.

Based on the measurement information acquired by the measurement information acquisition unit 51, the area determination unit 52 determines whether a position of the user is on a sea side or a land side of a coastline. Incidentally, when it is determined that the user is floating on a wave based on the measurement information acquired by the measurement information acquisition unit 51, the area determination unit 52 may determine that the position of the user is on the sea side of the coastline.

The output control unit 53 displays a user interface screen (UI screen) for outputting various information items to the user on the wrist terminal 1. For example, the output control unit 53 performs a screen display for measuring a wave state.

Figure 3:
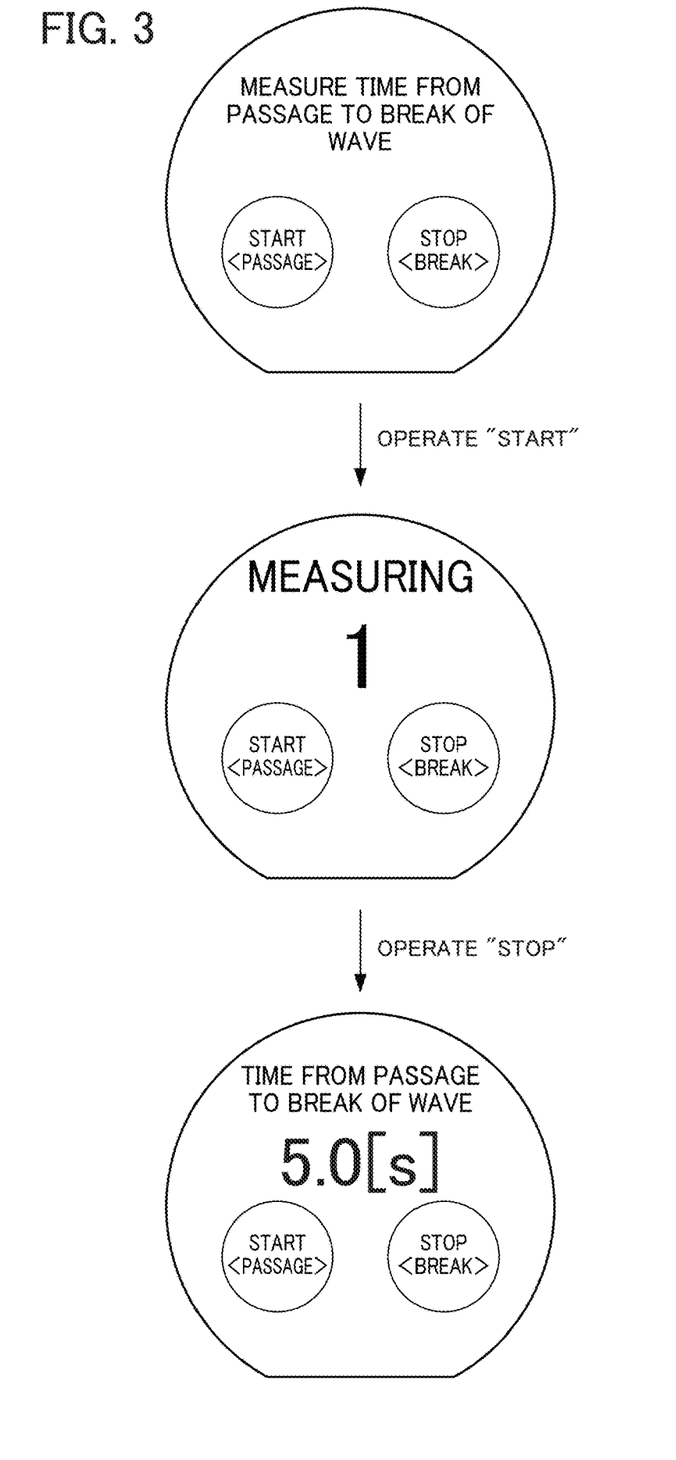
FIG. 3 is a schematic diagram illustrating a transition example of a screen display for measuring a wave state.

FIG. 3 is a schematic diagram illustrating a transition example of a screen display for measuring a wave state. As illustrated in FIG. 3, on the screen display for measuring the wave state, at the beginning, a message urging the user to measure the wave state ("Measure time from passage to break of wave", etc.), button icons for inputting start and stop of measurement, etc. are displayed.

When the button icon representing the start of measurement is operated, the output control unit 53 counts up time (seconds), displays the time on the screen, and outputs vibration every count. Incidentally, the button icon representing the start of measurement is operated in accordance with a timing at which a wave (or swell) passes through a current position of the user. However, with regard to the start of measurement, it is possible to set automatic start of measurement at the timing at which the wave (or swell) passes through the current position of the user by the passage detection unit 55 (described below) detecting passage of the wave. In the present embodiment, automatic start of measurement is set by default, and measurement is started by an operation of the user. Then, when the button icon representing the stop of measurement is operated, the output control unit 53 displays the counted time. The button icon representing the stop of the measurement is operated in accordance with a timing at which the wave breaks. Even though an example is shown in which the button icon representing the start of measurement and the button icon representing the stop of measurement are separately provided, one button icon may be used to represent both the start and the stop. In addition, since the microphone is provided as a sensor responsive to sound in the sensor unit 12, a start/stop operation may be performed by voice. Further, it is possible to photograph the wave state by the image sensor, and automatically detect a timing at which a swell of a wave occurs, a timing at which a wave or a swell passes through a current position of the user, and a timing at which a wave breaks by image analysis, thereby setting a start/stop timing. In this case, since the amount of calculation increases, it is preferable to send image data acquired by the image sensor to an external device such as a server via Wi-Fi, etc. and receive a calculation result.

Further, in response to detecting that the user has taken off by the take-off detection unit 58, the output control unit 53 displays predetermined measurement information (riding continuation time, speed, etc.) as data under measurement on the LCD 14. Further, when an instruction to display data of the measurement result of the wave (or swell) is issued by the user, the output control unit 53 displays a map screen obtained by representing the measurement result of the wave (or swell) on a map (hereinafter referred to as a "wave state display map") on the LCD 14 based on measurement information recorded in the ROM 16 or the removable medium 31 by the recording control unit 56. Further, when an instruction to display a map screen of history data is issued by the user, the output control unit 53 displays a map screen obtained by representing a movement trajectory for each riding on a map (hereinafter referred to as a "movement trajectory display map") on the LCD 14 based on the measurement information recorded in the ROM 16 or the removable medium 31 by the recording control unit 56.

The operation detection unit 54 detects an operation performed by the user on a UI display screen or various buttons. For example, to measure the wave state, the operation detection unit 54 detects an operation indicating break of the wave input at a timing at which break of the wave is visually recognized by the user or an operation indicating passage of the wave input at a timing at which passage of the swell (or wave) is visually recognized. Further, when the user performs an operation indicating occurrence of a swell at a timing at which the swell (a phenomenon of a precursor to the wave) is visually recognized on an open sea at a predetermined distance (for example, 100 m) from a current position of the user to attempt take-off, the operation detection unit 54 detects the operation indicating occurrence of the swell performed by the user.

The passage detection unit 55 detects that the wave (or swell) passes through the current position of the user based on the measurement information acquired by the measurement information acquisition unit 51. For example, when acceleration rate of a predetermined value or more is continuously generated vertically upward and vertically downward, the passage detection unit 55 detects that the wave (or swell) passes through the current position of the user.

The recording control unit 56 determines whether the data related to the wave state is stored in the wave state data storage unit 71 by the operation detection unit 54 detecting the operation indicating break of the wave input at the timing at which break of the wave is visually recognized by the user or the operation indicating passage of the wave input at the timing at which passage of the swell (or wave) is visually recognized. When the data related to the wave state is not stored in the wave state data storage unit 71, screen display for measuring the wave state is performed by the output control unit 53. Further, when take-off of the user is detected by the take-off detection unit 58 detects, the recording control unit 56 records (saves) measurement information acquired by the measurement information acquisition unit 51 in the ROM 16 or the removable medium 31 mounted on the drive 22. Further, when wipeout of the user is detected by the wipeout detection unit 59, the recording control unit 56 records (saves) measurement information acquired by the measurement information acquisition unit 51 in the ROM 16 or the removable medium 31 mounted on the drive 22.

The advice reporting unit 57 determines whether the current position of the user is appropriate based on the current position of the user, the data related to the wave state stored in the wave state data storage unit 71, and the data of the riding history stored in the history data storage unit 72. Then, when the current position of the user is inappropriate, the advice reporting unit 57 displays a message indicating that the current position of the user is inappropriate and a direction to move to the user. For example, in a case in which data of a trajectory of the wave is stored in the wave state data storage unit 71 by performing an operation indicating a break after the wave (or swell) passes through the current position of the user, when the current position of the user is excessively close to a break point, the advice reporting unit 57 displays a message indicating that a land is excessively close to the user. Similarly, when the current position of the user is excessively far from the break point, the advice reporting unit 57 displays a message indicating that the land is excessively far (flowing to the open sea) to the user. For example, whether the break point is excessively close or excessively far can be determined based on a time until a timing at which the wave breaks. In addition, when the current position of the user is greatly deviated (separated by a set distance or more) from the data of the riding history stored in the history data storage unit 72 in a direction parallel to the coastline, the advice reporting unit 57 displays a message indicating that movement is performed in parallel to the coastline to the user.

In addition, the advice reporting unit 57 calculates a speed of the wave based on an operation of the user detected by the operation detection unit 54 and a detection result of the passage detection unit 55. Then, when the user performs an operation indicating occurrence of the swell (an operation of input at a timing at which the swell is visually recognized on the open sea at a predetermined distance (for example, 100 m) from the current position of the user) to attempt take-off, the advice reporting unit 57 calculates a break timing of the wave and reports a timing a preset notice time before the calculated break timing as a take-off timing (a timing suitable for take-off). For example, as a notice time preceding the break timing of the wave, the user sets one of selectable times (three seconds, four seconds, . . . , or 20 seconds prior to the break timing, etc.) every one second in advance. Further, when the user performs an operation indicating occurrence of the swell visually recognized on the open sea at the predetermined distance from the current position of the user, the advice reporting unit 57 calculates a break timing of a wave based on a speed of the wave and reports a timing the notice time before the timing as the take-off timing. When reporting by the advice reporting unit 57 is performed, the user starts a take-off operation using the report as a trigger. When an operation indicating occurrence of the swell is input, a button icon for inputting the operation indicating occurrence of the swell can be displayed by operating a predetermined button on a side surface of the wrist terminal 1 or setting a standby state of take-off, and the button icon may be operated at a timing at which the swell is visually recognized.

The take-off detection unit 58 determines whether the user wearing the wrist terminal 1 has taken off based on the measurement information acquired by the measurement information acquisition unit 51. In the present embodiment, it is presumed that whether the user wearing the wrist terminal 1 has taken off is determined based on whether a moving velocity is greater than or equal to a first threshold value Th1 (for example, 10 [km/s]).

The wipeout detection unit 59 determines whether the user wearing the wrist terminal 1 has wiped out based on the measurement information acquired by the measurement information acquisition unit 51. In the present embodiment, it is presumed that whether the user wearing the wrist terminal 1 has wiped out is determined based on whether the moving velocity is less than a second threshold value Th2 (for example, 2 [km/s]) lower than the first threshold value Th1. In the present embodiment, when the moving velocity is less than the second threshold value Th2 at three consecutive measurement points, it is determined that the user wipes out. Incidentally, even when a positioning result of the GPS module 19 is not obtained for a certain period (for example, 10 [sec]) or more after the take-off detection unit 58 detects take-off of the user, the wipeout detection unit 59 determines that the user has wiped out. The first threshold value Th1 and the second threshold value Th2 described above can be arbitrarily set by the user operating the wrist terminal 1.

Figure 4:
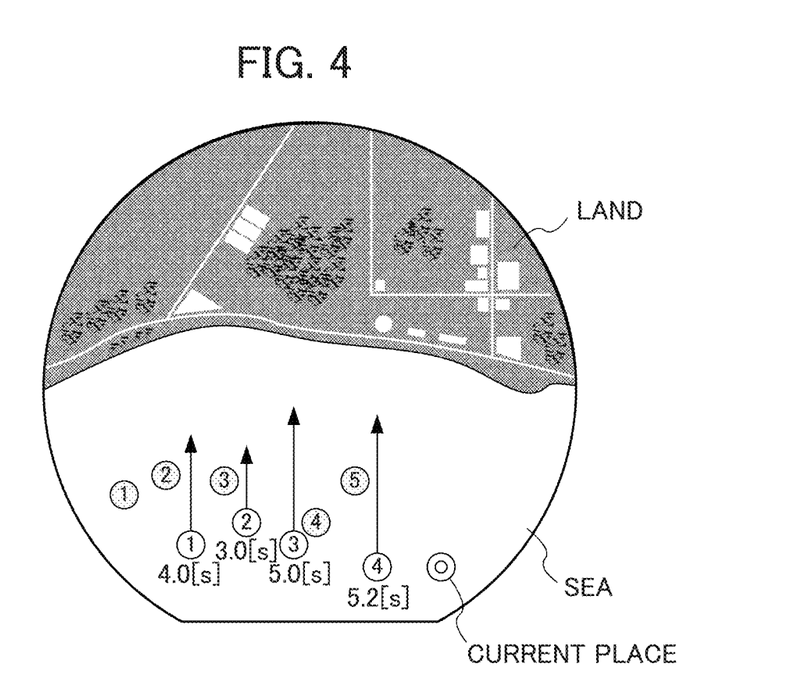
FIG. 4 is a schematic diagram illustrating an example of a wave state display map.

FIG. 4 is a schematic diagram illustrating an example of the wave state display map. As illustrated in FIG. 4, in the wave state display map, a trajectory until the wave (or swell) passing through the current position of the user breaks and a position at which the user takes off are displayed at positions corresponding to respective positioning positions. In addition, in each trajectory of the wave, a time until the wave breaks after the wave passes through the current position of the user is indicated together. Incidentally, in FIG. 4, the trajectory until the wave (or swell) passing through the current position of the user breaks is schematically illustrated as an arrow, and the arrow indicating the trajectory of the wave is expressed by a relative length corresponding to the time until the wave breaks after the wave passes through the current position of the user. In addition, a numerical value shown at a start point of the wave trajectory represents an order in which the waves is measured, a number shown independently represents a take-off position.

Figure 5:
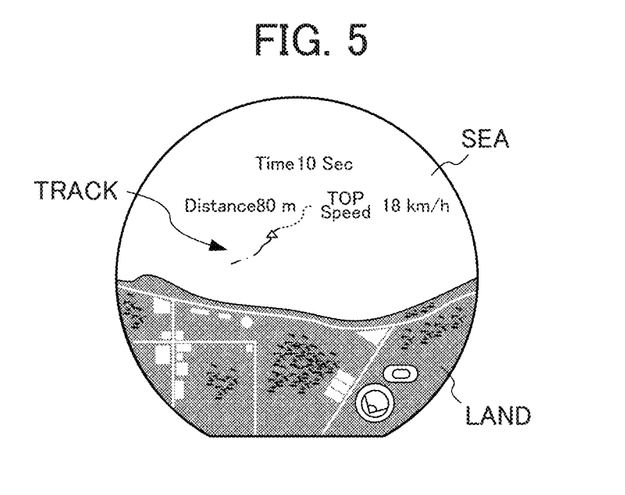
FIG. 5 is a schematic diagram illustrating an example of a movement trajectory display map.

FIG. 5 is a schematic diagram illustrating an example of the movement trajectory display map. As illustrated in FIG. 5, on a map screen, a plurality of lines, each of which represents a movement trajectory from a start position (take-off position) to an end position (wipeout position) corresponding to one riding as a riding trajectory, is displayed using a map of a coast near the current position as a background. In a line displayed on the map screen, a position of a maximum speed in the riding is identified and displayed by a mark, and a state of a speed at each position is identified and displayed by a difference in color of the line. For example, a position at which a speed is less than 20% of the maximum speed can be expressed in blue, a position at which a speed is 20% or more and less than 40% of the maximum speed can be expressed in light blue, a position at which a speed is 40% or more and less than 60% of the maximum speed can be expressed in green, a position at which a speed is 60% or more and less than 80% of the maximum speed can be expressed in yellow, and a position at which a speed is 80% or more of the maximum speed can be expressed in red. Incidentally, in FIG. 5, a state of speed at each position is schematically illustrated by a difference in line type.

[Operation]

Figure 6:
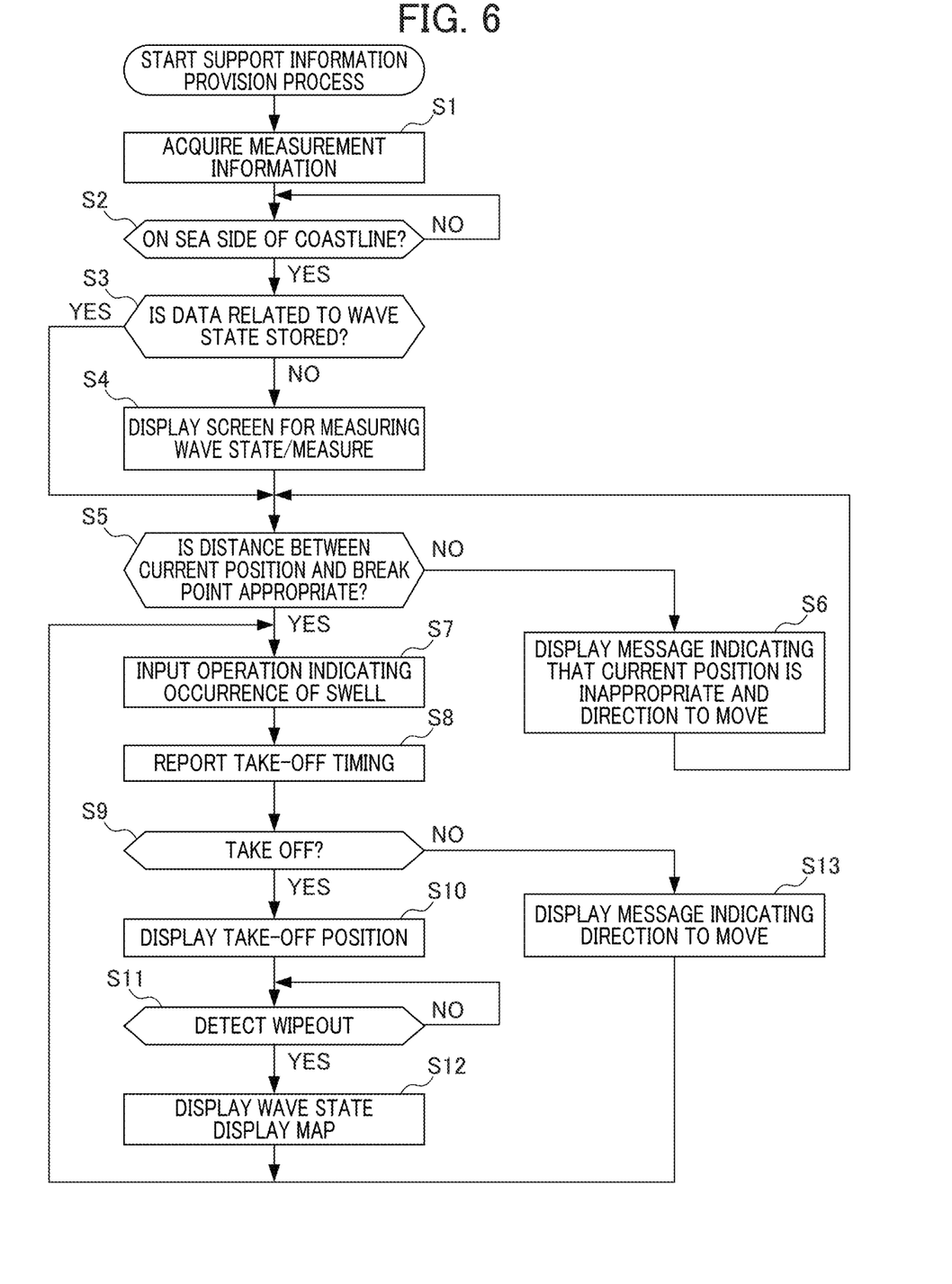
FIG. 6 is a flowchart for description of a flow of a log information recording process executed by the wrist terminal of FIGS. 1A and 1B having the functional configuration of FIG. 2.

Next, an operation of the wrist terminal 1 will be described. FIG. 6 is a flowchart for description of a flow of the support information provision process executed by the wrist terminal 1 of FIGS. 1A and 1B having the functional configuration of FIG. 2. The support information provision process is started by performing an operation of setting to a mode (surfing mode) in which measurement of surfing is performed among a plurality of measurement modes prepared in the wrist terminal 1. In step S1, the measurement information acquisition unit 51 acquires a positioning result of the GPS module 19 and detection results (measurement information) of various sensors included in the sensor unit 12. Thereafter, measurement information is acquired at a predetermined time interval (for example, an interval of 0.1 seconds) until a history recording process ends.

In step S2, the area determination unit 52 determines whether the position of the user is on the sea side of the coastline based on the measurement information acquired by the measurement information acquisition unit 51. When the position of the user is on the sea side of the coastline, YES is determined in step S2, and the process proceeds to step S3. On the other hand, when the position of the user is on the land side of the coastline, NO is determined in step S2, and processing of step S2 is repeated. In step S3, the recording control unit 56 determines whether the data related to the wave state is stored in the wave state data storage unit 71. When the data related to the wave state is not stored in the wave state data storage unit 71, NO is determined in step S3, and the process proceeds to step S4. On the other hand, when the data related to the wave state is stored in the wave state data storage unit 71, YES is determined in step S3, and the process proceeds to step S5.

In step S4, the output control unit 53 displays a screen for measuring the wave state. As a screen display for measuring the wave state, for example, a message urging the user to measure the wave state is displayed. In response to the screen display displayed in step S4, the wave state is measured by the user. In step S5, the advice reporting unit 57 determines whether a distance between the current position of the user and the break point of the wave is appropriate. When the distance between the current position of the user and the break point of the wave is inappropriate (the current position and the break point are excessively close to each other or excessively far from each other), NO is determined in step S5, and the process proceeds to step S6. On the other hand, when the distance between the current position of the user and the break point of the wave is appropriate, YES is determined in step S5, and the process proceeds to step S7.

In step S6, the advice reporting unit 57 displays a message indicating that the current position of the user is inappropriate and a direction to move to the user. Incidentally, in this instance, the wave state display map may be displayed together. After step S6, the process proceeds to step S5. In step S7, the operation detection unit 54 detects an operation indicating occurrence of the swell visually recognized by the user on the open sea at a predetermined distance (for example, 100 m) from the current position of the user to attempt take-off. In step S8, in response to the operation indicating occurrence of the swell performed by the user to attempt take-off, the advice reporting unit 57 calculates a break timing of the wave and reports a timing a preset notice time before the calculated break timing as a take-off timing.

In step S9, the take-off detection unit 58 determines whether the user wearing the wrist terminal 1 has taken off based on the measurement information acquired by the measurement information acquisition unit 51. When the user wearing the wrist terminal 1 has taken off, YES is determined in step S9, and the process proceeds to step S10. On the other hand, when the user wearing the wrist terminal 1 has not taken off, NO is determined in step S9, and the process proceeds to step S13.

In step S10, the output control unit 53 displays a take-off position of the user on the wave state display map. Incidentally, in step S10, the recording control unit 56 starts to record (save) the measurement information acquired by the measurement information acquisition unit 51. In step S11, the wipeout detection unit 59 determines whether the user wearing the wrist terminal 1 has wiped out based on the measurement information acquired by the measurement information acquisition unit 51. When the user wearing the wrist terminal 1 has not wiped out, NO is determined in step S11, and processing of step S11 is repeated. On the other hand, when the user wearing the wrist terminal 1 has wiped out, YES is determined in step S11, and the process proceeds to step S12.

In step S12, the output control unit 53 displays the wave state display map. Incidentally, in step S12, the recording control unit 56 suspends recording (saving) of the measurement information acquired by the measurement information acquisition unit 51. After step S12, the process proceeds to step S7.

In step S13, the advice reporting unit 57 displays a message indicating a direction to move to the user. After step S13, the process proceeds to step S7. Such processing is continued until an operation for commanding an end of the support information provision process is performed by the user.

According to such processing, in the wrist terminal 1, it is determined whether the current position of the user is appropriate based on data related to the wave state directly measured at a site at which the user surfs. When the current position of the user is inappropriate, a message indicating that the current position of the user is inappropriate and a direction to move is displayed to the user. Therefore, the user may easily determine a place in which the user waits for the wave, and increase a probability of successful take-off.

In addition, in the wrist terminal 1, when the user visually recognizes the swell of the open sea, a take-off timing for riding on the swell (or wave) is reported based on a velocity, etc. of the wave measured at the site at which surfing is performed by performing an operation indicating occurrence of the swell. Therefore, the user may reduce a possibility of missing a timing for riding on a target wave and increase a probability of successful take-off.

In addition, in the wrist terminal 1, data on the wave state directly measured at the site at which the user surfs is displayed in chronological order, and thus it is possible to detect a change in tide at the site at which the user surfs. Therefore, the user may select a more appropriate position to wait for a wave, thereby increasing the probability of successful take-off.

Modified Example 1

Figure 7A:
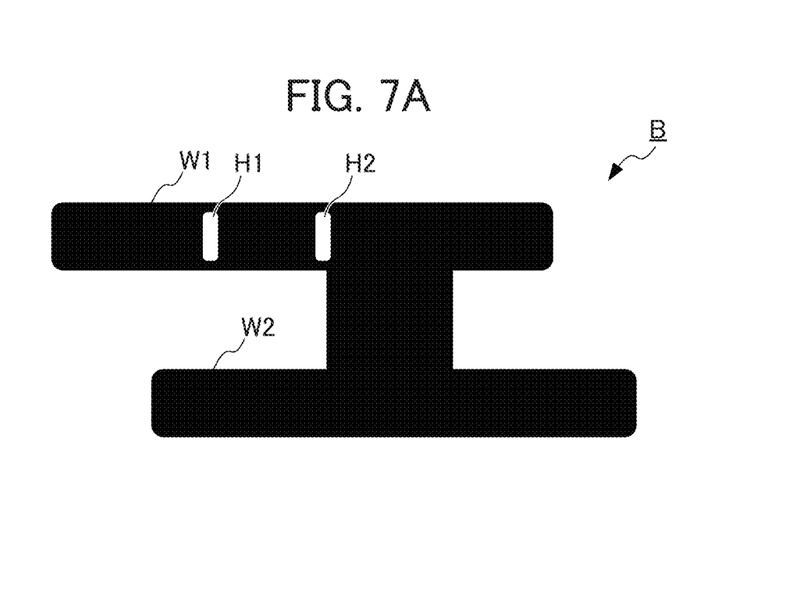
FIG. 7A is a plan view (schematic diagram) of an attachment member for attaching the wrist terminal to a user.
Figure 7B:
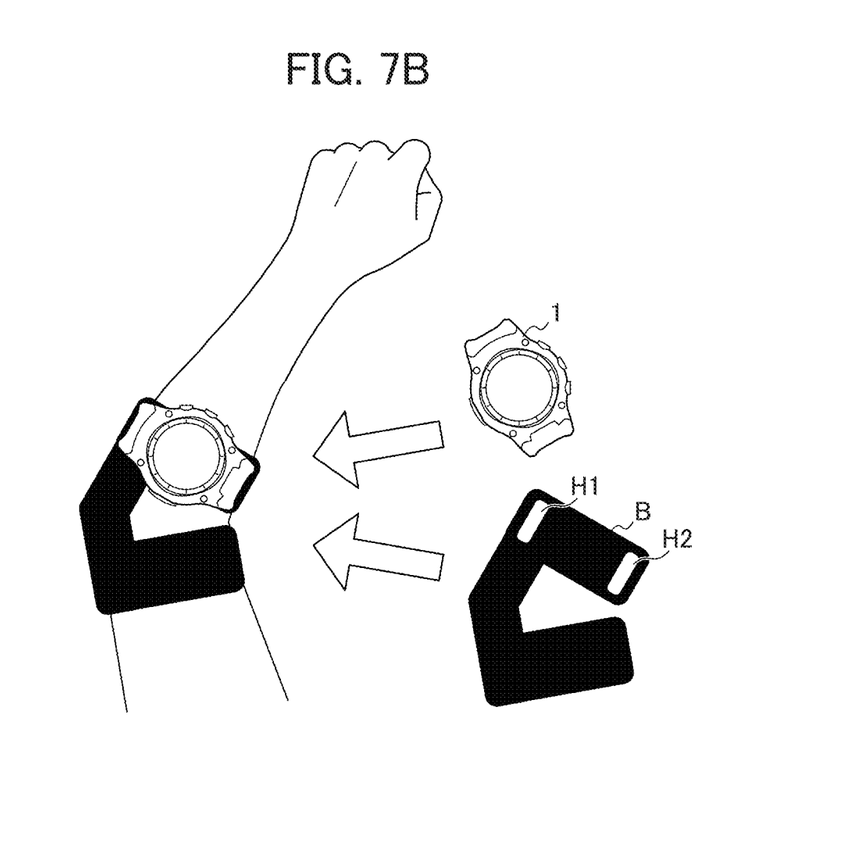
FIG. 7B is a schematic diagram illustrating a state in which the attachment member is attached to the user.

In the above-described embodiment, to further prevent the wrist terminal 1 from submerging and measurement accuracy of the measurement information from decreasing, it is possible to use an attachment member for attaching the wrist terminal 1 to a portion (near an elbow, etc.) that is more difficult to submerge than an arm in the user. FIG. 7A is a plan view (schematic diagram) of an attachment member B for attaching the wrist terminal 1 to the user. In addition, FIG. 7B is a schematic diagram illustrating a state in which the attachment member B is attached to the user. As illustrated in FIG. 7A, the attachment member B is made of a band-shaped member having flexibility and includes a winding portion W1 wound around a forearm of the user, a winding portion W2 wound around an upper arm of the user, and two belt through holes H1 and H2 through which a belt of the wrist terminal 1 passes. Incidentally, the belt through holes H1 and H2 are formed in the winding portion W1. In addition, a fixed member that can be fixed at an arbitrary position such as a surface fastener is provided in the winding portions W1 and W2.

When the wrist terminal 1 is worn using the attachment member B, the belt of the wrist terminal 1 is inserted into the belt through holes H1 and H2 of the winding portion W1, the winding portion W1 is wound and fixed around the forearm (near the elbow) of the user, and the winding portion W2 is wound and fixed around the upper arm of the user. In this way, the wrist terminal 1 is fixed at a forearm position. In this instance, when parts of the belt of the wrist terminal 1 wound around the forearm reach each other, the parts of the belt of the wrist terminal 1 may be fixed to each other. When the wrist terminal 1 is simply wound around the forearm, since a human arm narrows toward a wrist, the wrist terminal 1 gradually moves to the wrist side. However, when the attachment member B is used, the wrist terminal 1 may be surely fixed at the forearm position. Incidentally, the belt through holes H1 and H2 may be formed in the winding portion W2. In this case, the wrist terminal 1 is fixed at an upper arm position.

Modified Example 2

In the above-described embodiment, when the wave state display map and the movement trajectory display map are displayed, map information around the current position of the user may be acquired, and an image of an actual coastline may be displayed as a background. For example, in response to acquisition of the current position by the measurement information acquisition unit 51, the output control unit 53 may acquire the map information around the current position from an external device (a server providing the map information, etc.) via Wi-Fi, and use the acquired map information for displaying the background. In this way, the user may recognize a characteristic of the actual coastline, and thus it is possible to move to a more appropriate wave standby point to increase the probability of successful take-off.

The wrist terminal 1 configured as described above includes the LCD 14 and the output control unit 53. The output control unit 53 measures a time from when the swell of the wave occurs or passes until the swell breaks. The output control unit 53 causes the LCD 14 to report time information or timing information based on the measured time. In this way, it is possible to directly measure data related to the wave at the site and report the time information or the timing information. Therefore, it is possible to more appropriately support the user performing a water sport.

The wrist terminal 1 includes the take-off detection unit 58. The take-off detection unit 58 acquires a position at which the user takes off. The output control unit 53 causes the LCD 14 to display position information of the acquired take-off position. In this way, in addition to the data on the measured wave, it is possible to display position information of a position at which the user succeeds in take-off. Therefore, it is possible to provide more useful information for the user.

The time information corresponds to a figure representing the measured time according to a length of the time. In this way, it is possible to display the data on the wave in a form intuitively easy to understand.

The output control unit 53 causes the LCD 14 to display a plurality of pieces of time information of the measured time. In this way, the user may statistically analyze the data on the wave.

The output control unit 53 causes the LCD 14 to display past take-off position information and current position information. In this way, the user may easily detect a position at which take-off has been successful.

The output control unit 53 acquires a timing at which the swell of the wave occurs by an instruction of the user. In this way, the timing at which the swell occurs may be detected in the wrist terminal 1.

The wrist terminal 1 includes the advice reporting unit 57. The advice reporting unit 57 determines that it is a timing to take off during a time from when the swell of the wave occurs until the swell breaks, and the output control unit 53 informs the user of a determination result using the LCD 14. In this way, the user may reduce a possibility of missing a timing for riding on a target wave and increase a probability of successful take-off.

The output control unit 53 informs the user of the measured time using the LCD 14. In this way, it is possible to inform the user of a time until the wave the breaks.

The output control unit 53 acquires map information. The output control unit 53 displays an image of the coast on a background of the screen of the display unit based on the map information. In this way, the user may recognize a characteristic of the actual coastline, and thus it is possible to move to a more appropriate point.

In addition, the wrist terminal 1 is used for a water sport, and includes the LCD 14, the measurement information acquisition unit 51, and the output control unit 53. The output control unit 53 measures a time from when the swell of the wave occurs or passes until the swell breaks. The output control unit 53 causes the LCD 14 to display time information of the measured time. The output control unit 53 causes the LCD 14 to display past take-off position information and current position information. In this way, the user may easily detect a position at which take-off has been successful.

It should be noted that the present invention is not to be limited to the aforementioned embodiments, and that modifications, improvements, etc. within a scope that can achieve the objects of the present invention are also included in the present invention.

For example, a case in which the current position of the user when the wave passes by the user is set to the start point of the trajectory of the wave in the wave state display map has been described as an example. However, the invention is not limited thereto. For example, it is possible to display a segment of a length corresponding to a predetermined distance in front of the current position of the user in the wave state display map by reflecting an operation input by the user at a timing at which the swell is visually recognized on the open sea at the predetermined distance from the current position of the user. For example, a length of this segment may be a fixed length or a variable length reflecting the wave speed of the day.

In addition, in the above-described embodiment, the wave state display map and the movement trajectory display map are separately displayed. However, the invention is not limited thereto. That is, it is possible to display a map in which display content of the wave state display map and display content of the movement trajectory display map are combined. In addition, in the above-described embodiment, it is possible to determine whether surfing is in a take-off state by the control unit 11 determining whether the user is floating on the wave based on the measurement information.

In addition, in the above-described embodiment, it is possible to determine that take-off occurs by the take-off detection unit 58 detecting that the user rises on the surfboard from a state of floating on the wave based on the measurement information. In this case, it is possible to detect upward acceleration rate due to rising or detect that waveforms of acceleration rate and an angular rate are different from those in a case of floating.

In addition, in the above-described embodiment, it is possible to determine that wipeout occurs by the wipeout detection unit 59 detecting that the user has got off to the sea from a standing state based on the measurement information. In this case, it is possible to detect downward acceleration rate due to getting off to the sea or detect that waveforms of acceleration rate and an angular rate are different from those in a case of standing on the surfboard.

In addition, in the above-described embodiment, a condition of wipeout may correspond to a case in which a state of less than a predetermined speed continues for a predetermined time or more. In this way, it is possible to suppress determination of wipeout in a case of turning with a relatively slow wave, etc.

In addition, in the above-described embodiment, when the map screen is displayed, a scale of a map may be set according to the length of the movement trajectory. Further, when the map screen is displayed, it is possible to set a range of a map such that a latest movement trajectory is displayed in a predetermined area (central portion, etc.) on the display screen of the LCD 14. In addition, in the above-described embodiment, a plurality of movement trajectories may be displayed together on the map screen.

In addition, in the above-described embodiment, GPS is used to acquire the position information. However, the invention is not limited thereto. For example, it is possible to use SiRFusion (registered trademark) that acquires accurate position information at high speed using a Wi-Fi access point, quantum compass that can measure a position underwater, etc.

In addition, in the above-described embodiment, the positioning result of the GPS module 19 and the detection results (measurement information) of the various sensors included in the sensor unit 12 are acquired every time. However, positioning of the GPS module 19 may be performed when a specific moving state is determined from measurement information. Since power consumption of the GPS module is large, power saving is achieved.

In addition, in the above-described embodiment, the wrist terminal has been described as an example of an electronic device to which the invention is applied. However, the invention is not particularly limited thereto. For example, the invention is applicable to a general electronic device having a function of measuring movement. Specifically, for example, the invention is applicable to a notebook type personal computer, a tablet type terminal, a video camera, a portable navigation device, a mobile phone, a smartphone, a portable game machine, etc.

In addition, in the above-described embodiment, the control unit 11 in the wrist terminal 1 controls the operation illustrated in the flowchart of FIG. 6. However, data may be sent to a smartphone, etc. via the wireless communication module 21, arithmetic processing may be performed by the smartphone, and a result thereof may be returned to the wrist terminal 1 and displayed on the LCD 14. In addition, in the above-described embodiment, various data items are recorded in the RAM 17 or the removable medium 31 in the wrist terminal 1. However, data may be sent to the smartphone, etc. via the wireless communication module 21 and recorded in the smartphone, etc.

The processing sequence described above can be executed by hardware, and can also be executed by software. In other words, the hardware configuration of FIG. 2 is merely illustrative examples, and the present invention is not particularly limited thereto.

More specifically, the types of functional blocks employed to realize the above-described functions are not particularly limited to the examples shown in FIG. 2, so long as the wrist terminal 1 can be provided with the functions enabling the aforementioned processing sequence to be executed in its entirety.

A single functional block may be constituted by a single piece of hardware, a single installation of software, or a combination thereof.

The functional configurations of the present embodiment are realized by a processor executing arithmetic processing, and processors that can be used for the present embodiment include a unit configured by a single unit of a variety of single processing devices such as a single processor, multi-processor, multi-core processor, etc., and a unit in which the variety of processing devices are combined with a processing circuit such as ASIC (Application Specific Integrated Circuit) or FPGA (Field-Programmable Gate Array).

In the case of having the series of processing executed by software, the program constituting this software is installed from a network or storage medium to a computer or the like. The computer may be a computer equipped with dedicated hardware.

In addition, the computer may be a computer capable of executing various functions, e.g., a general purpose personal computer, by installing various programs.

The storage medium containing such a program can not only be constituted by the removable medium 31 of FIG. 1B distributed separately from the device main body for supplying the program to a user, but also can be constituted by a storage medium or the like supplied to the user in a state incorporated in the device main body in advance. The removable medium 31 is composed of, for example, a magnetic disk (including a floppy disk), an optical disk, a magnetic optical disk, or the like. The optical disk is composed of, for example, a CD-ROM (Compact Disk-Read Only Memory), a DVD (Digital Versatile Disk), Blu-ray (Registered Trademark) or the like. The magnetic optical disk is composed of an MD (Mini-Disk) or the like. The storage medium supplied to the user in a state incorporated in the device main body in advance is constituted by, for example, semiconductor memories, and the like included in the ROM 16 in which the program is recorded of FIG. 1.

It should be noted that, in the present specification, the steps defining the program recorded in the storage medium include not only the processing executed in a time series following this order, but also processing executed in parallel or individually, which is not necessarily executed in a time series. Further, in this specification, the term of the system shall mean an entire apparatus composed of a plurality of apparatuses, a plurality of means and the like.

The embodiments of the present invention described above are only illustrative, and are not to limit the technical scope of the present invention. The present invention can assume various other embodiments. Additionally, it is possible to make various modifications thereto such as omissions or replacements within a scope not departing from the spirit of the present invention. These embodiments or modifications thereof are within the scope and the spirit of the invention described in the present specification, and within the scope of the invention recited in the claims and equivalents thereof.

EXPLANATION OF REFERENCE NUMERALS

1 . . . WRIST TERMINAL, 11 . . . CONTROL UNIT, 12 . . . SENSOR UNIT, 13 . . . INPUT UNIT, 14 . . . LCD, 15 . . . CLOCK CIRCUIT, 16 . . . ROM, 17 . . . RAM, 18 . . . GPS ANTENNA, 19 . . . GPS MODULE, 20 . . . WIRELESS COMMUNICATION ANTENNA, 21 . . . WIRELESS COMMUNICATION MODULE, 22 . . . DRIVE, 31 . . . REMOVABLE MEDIUM, 51 . . . MEASUREMENT INFORMATION ACQUISITION UNIT, 52 . . . AREA DETERMINATION UNIT, 53 . . . OUTPUT CONTROL UNIT, 54 . . . OPERATION DETECTION UNIT, 55 . . . PASSAGE DETECTION UNIT, 56 . . . RECORDING CONTROL UNIT, 57 . . . ADVICE REPORTING UNIT, 58 . . . TAKE-OFF DETECTION UNIT, 59 . . . WIPEOUT DETECTION UNIT, 71 . . . WAVE STATE DATA STORAGE UNIT, 72 . . . HISTORY DATA STORAGE UNIT, B . . . ATTACHMENT MEMBER, W1, W2 . . . WINDING PORTION, H1, H2 . . . BELT THROUGH HOLE

What is claimed is:

1. An apparatus used for a water sport, the apparatus comprising:
   a CPU and a memory;
   a display; and
   a measurement device configured to measure a time from a timing when a swell of a wave occurs or passes through a position of a user until timing when the swell breaks,
   wherein the CPU is configured by a program stored in the memory to:
      acquire trajectory information on a trajectory from when the swell of the wave occurs or passes through the position of the user until when the swell breaks using the measured time;
      acquire current position information on a current position of the user; and
      cause the display to display the acquired trajectory information on the trajectory together with the acquired current position information.

2. The apparatus according to claim 1,
   wherein the measurement device is configured such that the user is allowed to perform a start operation at a timing at which the swell is visually recognized and perform a stop operation at a timing at which the swell breaks, and to measure the time or a distance from when the swell of the wave occurs or passes until when the swell breaks according to the start operation and the stop operation.

3. The apparatus according to claim 1,
   wherein the measurement device is configured to automatically start measuring the time at the timing when the swell passes through the current position of the user.

4. The apparatus according to claim 3,
   wherein the measurement device comprises an acceleration rate sensor, and
   wherein the measurement device is configured to detect the timing when the swell of the wave passes through the current position of the user when acceleration rate of a predetermined value or more is continuously generated vertically upward and vertically downward.

5. The apparatus according to claim 3, wherein the measurement device comprises an image sensor, and
wherein the measurement device is configured to analyze an image of the wave acquired by the image sensor to detect the timing when the swell of the wave occurs or passes through the current position of the user.

6. The apparatus according to claim 1,
wherein the CPU is configured to:
acquire a take-off position at which the user has taken off; and
cause the display to display the take-off position.

7. The apparatus according to claim 1,
wherein the CPU is configured to cause the display to display a figure representing a length of the measured time from the timing when the swell of the wave occurs or passes through the position of the user until timing when the swell breaks.

8. The apparatus according to claim 1,
wherein the CPU is configured to cause the display to display a plurality of pieces of the time from the timing when the swell of the wave occurs or passes through the position of the user until timing when the swell breaks.

9. The apparatus according to claim 6,
wherein the CPU is configured to cause the display to display past take-off position information and the current position information.

10. The apparatus according to claim 1,
wherein the CPU is configured to cause the display to inform the user that the time from when the swell of the wave occurs or passes through the position of the user until timing when the swell breaks corresponds to a timing to take off.

11. The apparatus according to claim 1, wherein the memory
wherein the CPU causes the memory to store a wave state including the time and a distance from the timing when a swell of the wave occurs or passes through the position of the user until the timing when the wave breaks.

12. The apparatus according to claim 1,
wherein the water sport corresponds to surfing,
wherein the memory further stores data of a riding history for each ride of surfing, and
wherein the data of the riding history includes at least one of a riding trajectory, a top speed, a distance of one riding, a time of one riding, and a take-off time.

13. The apparatus according to claim 1, further comprising
a GPS module and an atmospheric pressure sensor,
wherein the CPU is configured to successively acquire a positioning result of the GPS module and detection results of the atmospheric pressure sensor at a predetermined time interval.

14. The apparatus according to claim 1,
wherein the CPU is configured to:
acquire map information; and
cause the display to display an image of a coast on a background of a screen of the display based on the map information along with the acquired trajectory information on the trajectory together with the acquired current position information.

15. The apparatus according to claim 1, wherein the CPU is configured to:
cause the display time information of a time measured by the measurement device; and
cause the display to display past take-off position information of the user and current position information of the user.

16. The apparatus according to claim 15,
wherein the CPU in configured to cause the display to display a wave state display map in which the trajectory from when the swell of the wave occurs or passes through the position of the user is illustrated.

17. The apparatus according to claim 16, wherein the CPU is configured to cause the display to display:
the wave state display map in which the trajectory from when the swell of the wave occurs or passes through the position of the user is illustrated schematically as an arrow;
an order in which waves are measured; and
a take-off position.

18. An information providing method executed by an apparatus used for a water sport including a display, the information providing method comprising:
measuring a time from a timing when a swell of a wave occurs or passes through a position of a user until timing when the swell breaks;
acquiring trajectory information on a trajectory from when the swell of the wave occurs or passes through the position of the user until when the swell breaks using the measured time;
acquiring current position information on a current position of the user; and
causing the display to display the acquired trajectory information on the trajectory together with the acquired current position information.

19. The information providing method according to claim 18,
wherein a plurality of pieces of the trajectory information acquired over time is stored, and
wherein the information providing method comprises causing the display to display the plurality of pieces of the trajectory information in chronological order together with the acquired current position information.

20. A non-transitory computer readable storage medium storing a program executable by a computer of an apparatus used for a water sport including a display, the program causing the computer to implement:
controlling a measurement device to measure a time from a timing when a swell of a wave occurs or passes through a position of a user until timing when the swell breaks;
acquiring trajectory information on a trajectory from when the swell of the wave occurs or passes through the position of the user until when the swell breaks using the measured time;
acquiring current position information of a current position of the user; and
causing the display to display the acquired trajectory information of the trajectory together with the acquired current position information.

* * * * *

UNITED STATES PATENT AND TRADEMARK OFFICE
CERTIFICATE OF CORRECTION

PATENT NO. : 10,821,346 B2
APPLICATION NO. : 16/140629
DATED : November 3, 2020
INVENTOR(S) : Takeshi Okada It is certified that error appears in the above-identified patent and that said Letters Patent is hereby corrected as shown below:

In the Claims

Column 15, Claim 11, Lines 35 and 36 should read:
The apparatus according to claim 1, Column 16, Claim 15, Line 3 should read:
cause the display to display time information of a time measured by Column 16, Claim 16, Line 9 should read:
wherein the CPU is configured to cause the display to Column 16, Claim 20, Line 58 should read:
acquiring current position information on a current posi- Column 16, Claim 20, Line 61 should read:
information on the trajectory together with the acquired Signed and Sealed this
Fourth Day of May, 2021

Drew Hirshfeld
*Performing the Functions and Duties of the*
*Under Secretary of Commerce for Intellectual Property and*
*Director of the United States Patent and Trademark Office*